United States Patent
Sakai (10) Patent No.: US 12,280,549 B2
(45) Date of Patent: Apr. 22, 2025

(54) SUPPORT MATERIAL FOR FUSED DEPOSITION MODELING, AND MANUFACTURING METHOD OF FUSED DEPOSITION MODELED STRUCTURE AND THREE-DIMENSIONAL OBJECT USING SAME

(71) Applicant: MITSUBISHI CHEMICAL CORPORATION, Tokyo (JP)

(72) Inventor: Norihito Sakai, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 289 days.

(21) Appl. No.: 17/944,668

(22) Filed: Sep. 14, 2022

(65) Prior Publication Data
US 2023/0023495 A1  Jan. 26, 2023

Related U.S. Application Data

(63) Continuation of application No. PCT/JP2021/010809, filed on Mar. 17, 2021.

(30) Foreign Application Priority Data

Mar. 31, 2020 (JP) .................. 2020-062287

(51) Int. Cl.
*B29C 64/40* (2017.01)
*B29C 64/118* (2017.01)
(Continued)

(52) U.S. Cl.
CPC ............ *B29C 64/40* (2017.08); *B29C 64/118* (2017.08); *B33Y 10/00* (2014.12); *B33Y 70/00* (2014.12);
(Continued)

(58) Field of Classification Search
CPC ........ C08L 29/04; C08L 67/02; C08F 218/08; C08F 228/02
See application file for complete search history.

(56) References Cited

U.S. PATENT DOCUMENTS

| | | |
|---|---|---|
| 2017/0087775 A1 | 3/2017 | Sakai et al. |
| 2017/0232684 A1 | 8/2017 | Yoshimura et al. |
| | (Continued) | |

FOREIGN PATENT DOCUMENTS

| | | |
|---|---|---|
| EP | 3 575 065 A1 | 12/2019 |
| JP | 2016-078284 A | 5/2016 |
| | (Continued) | |

OTHER PUBLICATIONS

ISR issued in International Patent Application No. PCT/JP2021/010809, May 11, 2021, translation.
(Continued)

*Primary Examiner* — Mark S Kaucher
(74) *Attorney, Agent, or Firm* — GREENBLUM & BERNSTEIN, P.L.C.

(57) ABSTRACT

Disclosed is a support material for a fused deposition modeling. The support material has excellent adhesion to a variety of model materials and is easily dissolved and removed by washing with water. Also, the waste liquid (PVA-based aqueous solution) generated after the washing operation may be allowed to be drained as it is, in compliance with environmental regulations. The support material comprises (A) PVA-based resin having a group containing sulfonic acid or a salt thereof and (B) biodegradable polyester. The (A) PVA-based resin having a group containing sulfonic acid or a salt thereof and (B) biodegradable polyester have a sea-island structure in which one is dispersed in the other as a matrix.

13 Claims, 1 Drawing Sheet (51) Int. Cl.
   *B33Y 10/00*   (2015.01)
   *B33Y 70/00*   (2020.01)
   *B33Y 80/00*   (2015.01)
   *B29K 629/00*   (2006.01)
   *B29K 667/00*   (2006.01)

(52) U.S. Cl.
   CPC ........ *B33Y 80/00* (2014.12); *B29C 2791/002* (2013.01); *B29K 2629/04* (2013.01); *B29K 2667/00* (2013.01); *B29K 2715/006* (2013.01); *B29K 2995/006* (2013.01)

(56) References Cited

U.S. PATENT DOCUMENTS

| | | |
|---|---|---|
| 2019/0211200 A1 | 7/2019 | Sakai et al. |
| 2020/0055257 A1 | 2/2020 | Kumaki et al. |

FOREIGN PATENT DOCUMENTS

| | | |
|---|---|---|
| JP | 2018-086814 A | 6/2018 |
| JP | 2018-099788 A | 6/2018 |
| JP | 2019-155917 A | 9/2019 |
| JP | 2019-531214 A | 10/2019 |
| WO | 2015/182681 A1 | 12/2015 |
| WO | 2018/061694 A1 | 4/2018 |
| WO | 2018/139537 A1 | 8/2018 |

OTHER PUBLICATIONS

Written Opinion issued in International Patent Application No. PCT/JP2021/010809, May 11, 2021, translation.

IPRP issued in International Patent Application No. PCT/JP2021/010809, Sep. 29, 2022, translation.

Extended European Search Report that issued in corresponding European Patent Application No. 21779712.5, dated Dec. 12, 2023.

Office Action that issued in Japanese Patent Application No. 2022-511845, dated Oct. 7, 2024, along with English translation thereof.

SUPPORT MATERIAL FOR FUSED DEPOSITION MODELING, AND MANUFACTURING METHOD OF FUSED DEPOSITION MODELED STRUCTURE AND THREE-DIMENSIONAL OBJECT USING SAME

CLAIM FOR PRIORITY

This application is a Continuation of PCT/JP2021/010809 filed Mar. 17, 2021, and claims the priority benefit of Japanese application 2020-062287 filed Mar. 31, 2020, the contents of which are expressly incorporated by reference herein in their entireties.

TECHNICAL FIELD

The present invention relates to a support material having excellent adhesion to a target model to be created by fused deposition modeling, the support material being environmentally friendly and easily removed from the fused deposition modeled structure. The present invention also relates to the fused deposition modeled structure including a support structure made of the support material, and a method for manufacturing a three-dimensional object as the target model.

BACKGROUND

A fused deposition modeling is a method of forming a three-dimensional object having a desired shape, in which a fluid material is extruded, solidified to form a layer, and a continuously extruded fluid material is placed on top of the previous layer and solidified to create an object layer by layer. The method of manufacturing a three-dimensional object includes a UV curing method, a fused deposition modeling method, and the like. The fused deposition modeling method can be executed using a simple apparatus and is widely used.

In a fused deposition modeling for forming a three-dimensional object, a support structure which is auxiliary for infilling a target three-dimensional object is formed during the fused deposition modeling. The support structure is a mere auxiliary part during the printing process of the target three-dimensional object, and therefore needs to be removed from the fused deposition modeled structure after the printing process.

Dissolution of a support structure with a solvent is a simple method capable of removing the support structure can be removed without damaging a target model. In the case of using a polyvinyl alcohol-based resin (PVA-based resin) as a support material, water may be chosen for the solvent because of water solubility of the PVA-based resin. And removal operation with use of water is safe and environmentally friendly.

On the other hand, PVA-based resin is rigid and inferior in impact resistance, and is not easy to be melt molded and fiberized. If such a PVA-based resin is used for a support material applicable a variety of shapes, PVA-based resin should be given flexibility and impact resistance. In order to give them to the PVA-based resin, there are proposals to mix a thermoplastic elastomer such as styrene-ethylene-butylene-styrene block copolymer (SEBS) with the PVA-based resin (for example, disclosed by WO 2015/182681, WO 2018/061694, and JP 2019-155917 A).

The support material proposed by the above-mentioned documents has a sea-island structure in which SEBS (island component) is dispersed in the PVA-based resin as a matrix (sea component). A waste liquid generated by the removal operation using water, is an aqueous solution of the PVA-based resin. The aqueous solution is a suspension in which water-insoluble SEBS is dispersed in water. Since the waste liquid contains non-biodegradable SEBS, separation of the SEBS is required when the waste liquid is disposed.

Taking into consideration the trend of green chemistry, JP 2018-099788A has proposed to use biodegradable polyester in place of non-biodegradable SEBS. The proposed support material for fused deposition modeling adopts a composition which comprises a side chain 1,2-diol-containing PVA-based resin and a biodegradable polyester. This support material is excellent in adhesion to polylactic acid (PLA)-based resin which is widely used as a model material for fused deposition molding. This is an advantage as well.

PRIOR ART

Patent Document

[Patent Document 1] WO 2015/182681
[Patent Document 2] WO 2018/061694
[Patent Document 3] JP 2019-155917A
[Patent Document 4] JP 2018-099788A

SUMMARY OF THE INVENTION

Technical Problem to be Solved by the Invention

The composition for a support material, which comprises the side chain 1,2-diol-containing PVA resin and the biodegradable polyester, is advantageous from the viewpoint of green chemistry. However, the support material has the following problems which hinder the expansion in commercial use thereof:

Problem 1: The support material has a satisfactory adhesion to PLA resin, but not satisfactory adhesion to other typical resins such as ABS.

Problem 2: The biodegradable polyester has low water solubility, therefore, the polyester gathers to become agglomerates when dissolving the support material in water for a removal operation. The agglomerates may remain on a model structure, or wastewater after the washing process causes clogging.

Problem 3: In the case that the support material is fiberized by melt molding, deviation in diameter of the produced filament is relatively large.

Under these circumstances, the present invention has been made. The purpose of the invention is to provide a support material having excellent adhesion to a model material for fused deposition modeling, such as not only polylactic acid (PLA) but also acrylonitrile-butadiene-styrene copolymer (ABS), polyamide (PA), glycol-modified polyethylene terephthalate (PETG) and polycarbonate (PC). Moreover, the support material can be disposed of by dissolution in water without raising a problem concerning agglomerates. In addition, the waste liquid, which is a resulting PVA-based resin aqueous solution after washing process, may be complied with environmental regulations.

Means for Solving the Problem

The support material for fused deposition modeling of the present invention comprises (A) a polyvinyl alcohol-based resin having a group containing sulfonic acid or a salt thereof; and (B) a biodegradable polyester.

The (A) polyvinyl alcohol-based resin having a group containing sulfonic acid or a salt thereof is a polyvinyl alcohol-based resin having a structural unit represented by the following formula (3-1), (3-2), or (3-3) as a structural unit having a group containing sulfonic acid or a salt thereof.

[Chemical formula 3]

In the formulas (3-1), (3-2) and (3-3), M is a hydrogen, alkali metal or ammonium group, and X and Y each is a linking group.

The content of the structural units (3-1), (3-2), or (3-3) is preferably from 0.01 to 10 mol %.

Sodium acetate is preferably contained at a ratio of 0.5 to 2.0 parts by weight with respect to 100 parts by weight of (A) polyvinyl alcohol-based resin having a group containing sulfonic acid or a salt thereof.

Further, the (B) biodegradable polyester is contained preferably at a ratio of 5 to 100 parts by weight with respect to 100 parts by weight of (A) polyvinyl alcohol-based resin having a group containing sulfonic acid or a salt thereof.

In a preferable embodiment, the (A) polyvinyl alcohol-based resin having a group containing sulfonic acid or a salt thereof and the (B) biodegradable polyester form a phase-separated structure in which one is a matrix and the other is finely dispersed in the matrix. In a more preferred embodiment, they have a sea-island structure in which the (B) biodegradable polyester as an island component is dispersed in the sea of the (A) polyvinyl alcohol-based resin having a group containing sulfonic acid or a salt thereof. As for the sea-island structure, a size of the domain which is (B) biodegradable polyester is preferably from 0.05 to 2 μm.

In the (B) biodegradable polyester, the ratio of the aliphatic dicarboxylic acid unit to the dicarboxylic acid unit is preferably from 40 to 80 mol %.

The support material for fused deposition modeling of the invention is suitably used as a support material for a hot melt type fused deposition modeling. In this case, a support material for fused deposition modeling is preferably in the form of filament.

Another aspect of the invention includes a fused deposition modeled structure including a structure made of the support material of the invention. Further aspect of the invention includes a method of manufacturing a three-dimensional object using the support material for fused deposition modeling.

The method of manufacturing a three-dimensional object comprises extruding a molten support material for fused deposition modeling of the invention and a molten model material, solidifying the model material and the support material to form a structure layer by layer; and bringing an obtained fused deposition modeled structure into contact with water.

The method of manufacturing a three-dimensional object of the invention is suitable when the model material is polylactic acid, acrylonitrile-butadiene-styrene resin, polyamide resin, polyethylene terephthalate, or polycarbonate.

Effect of the Invention

Since the support material for fused deposition modeling of the present invention has an excellent adhesion to a variety of model materials and also has excellent water solubility. Therefore, insoluble agglomerates do not exist in the waste liquid after washing an obtained fused deposition modeled structure with water for removing a support structure from the fused deposition modeled structure.

Furthermore, since the support material is biodegradable, it is easy to dispose of the waste liquid generated by dissolution of the support material in washing with water and removal operation of the support structure. In addition, the wastewater is environmentally friendly.

EMBODIMENT FOR CARRYING OUT THE INVENTION

Hereinafter, the present invention will be described in detail, but the following are mere examples of desirable embodiments.

[Support Material for Fused Deposition Modeling]

A support material for fused deposition modeling of the present invention comprises (A) polyvinyl alcohol (PVA)-based resin having a group containing sulfonic acid or a salt thereof, and (B) a biodegradable polyester.

(A) PVA-Based Resin Having a Group Containing Sulfonic Acid or a Salt Thereof

The (A) PVA-based resin having a group containing sulfonic acid or a salt thereof used in the support material of the invention is excellent in water solubility and melt-molding property. Moreover, the PVA-based resin (A) has an excellent compatibility with (B) biodegradable polyester as the other essential component of the support material. Additionally, the support material can be provided in the form of filament. As for the fused deposition modeled structure using the support material, a washing operation with water for removing the support structure therein is convenient because of the dissolution of the support structure in water and no generation of agglomerates of the polyester in the wastewater after the washing operation. Therefore, the treatment of waste liquid after the washing and removal operation is not troublesome, described below.

That is, the (A) PVA-based resin having a group containing sulfonic acid or a salt thereof may exhibit compatibility to (B) biodegradable polyester described later because of the presence of the sulfonic acid or a salt thereof in the molecule of the PVA-based resin (A). If both of the components (A) and (B) are melt-kneaded, their phases are separated but either component (A) or (B) in the form of small domain is dispersed in the other component (B) or (A) as the matrix. In the case that the proportion of the component (A) of the PVA-based resin is more than half, they usually form a sea-island structure in which the PVA-based resin is sea component and the (B) biodegradable polyester is an island component. On the other hand, in the case of an unmodified PVA-based resin, the side chain 1,2-diol-containing PVA-based resin, and the like, polar groups contained in their molecules are merely a hydroxyl group and an acetyl group, so that their compatibility with (B) biodegradable polyester is low. As a result, the size of domain composed of the polyester resin which is an island component dispersed in the PVA resin as a sea component is from 2 to 5 μm. In this connection, when they are removed by washing with water, the wastewater would contain a large amount of agglomerates of (B) biodegradable polyester and a size of the agglomerates is from 2 mm to 5 mm. Such agglomerates adhere to the target model after the removal of the support structure and cause clogging of a filtration strainer used for wastewater treatment. This makes wastewater treatment troublesome. In this respect, since a PVA-based resin having a group containing sulfonic acid or a salt thereof is compatible to (B) biodegradable polyester, the (B) biodegradable polyester can exist as a domain having a size of 0.05 to 2 μm in a sea-island structure regardless of their phase separation. In a preferable sea-island structure, (B) biodegradable polyester may be finely dispersed in the form of domain (island) having a size of 0.1 to 1.0 μm, more preferably from 0.1 to 0.5 μm, in a matrix (sea) of (A) PVA-based resin having a group containing sulfonic acid or a salt thereof. As a result, the PVA-based resin aqueous solution as a wastewater generated by washing process is homogenously cloudy liquid, but not contains agglomerates of (B) biodegradable polyester. This means that there is no agglomerates remained on the target model and wastewater can be discharged in the wastewater treatment because of no occurrence of clogging in the filtration operation of the wastewater. Since the dispersoid polyester resin is biodegradable, discharged wastewater may not seriously affect the environment and may be complied with the recent microplastic regulations.

The (A) the PVA-based resin having a group containing sulfonic acid or a salt thereof comprises a vinyl alcohol unit represented by the following general formula (1), a vinyl ester unit represented by the following general formula (2), and a structural unit represented by the following general formula (3-1), (3-2), or (3-3). The vinyl alcohol unit is a basic structural unit of the PVA-based resin. The vinyl ester unit is contained as an unsaponified portion when the saponification degree is less than 100%. The structural unit (3-1), (3-2), or (3-3) contains a group of a sulfonic acid or a salt thereof in the side chain of the unit.

[Chemical Formula 1]

(1)

[Chemical Formula 2]

(2)

[Chemical Formula 3]

(3-1)

(3-2)

(3-3)

The vinyl alcohol unit (1) and the vinyl ester unit (2) both are derived from a vinyl ester compound used as a monomer making up the PVA-based resin.

Examples of the vinyl ester compound as a monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like. Of these, vinyl acetate is preferably used because of economy.

Therefore, in the formula (2), $R^a$ is an alkyl group having from 1 to 18 carbon atoms and depends on the vinyl ester compound used for a raw material for the synthesis of the PVA-based resin. $R^a$ is preferably a methyl group, and therefore a preferred vinyl ester unit is vinyl acetate unit represented by the formula (2a).

[Chemical formula 2a]

(2a)

In "—$SO_3M$" in the formulae (3-1), (3-2) and (3-3), M indicates hydrogen, alkali metal or ammonium group. When M is hydrogen, the —$SO_3M$ corresponds to sulfonic acid group. When M is an alkali metal or ammonium, the —$SO_3M$ corresponds to a salt of sulfonic acid-containing group. $R^1$, $R^2$, $R^3$, $R^4$, $R^5$, and $R^6$ in the each formula is independently hydrogen, an alkyl group having from 1 to 4 carbon atoms. Each of X and Y is a linking group. A typical linking group is an alkylene group having from 1 to 4 carbon atoms, ester bond, amide bond, ether bond, and the like. $R^c$ may be a hydrogen, an alkyl group, or a sulfonic acid- or its sulfonate-containing group represented by "—$SO_3M$" (M indicates a hydrogen, alkali metal or an ammonium group), or a —$SO_3M$-containing group.

The structural unit represented by the formula (3-1), which is a unit having a group containing sulfonic acid or a salt thereof, may be formed from an unsaturated monomer having a sulfonic acid or a salt thereof (hereinafter referred to as "sulfonic acid group-containing unsaturated monomer"). Examples of the sulfonic acid group-containing unsaturated monomer include olefin sulfonic acid (4-1), sulfoalkyl (meth)acrylamide (4-2) or (4-3), and sulfoalkyl (meth)acrylate (4-4), shown below. The linking groups X and Y are an alkylene group (—($CH_2$) n-), an ester bond (—COO—), and a carbonyl bond (—CO—), an amide bond, or a combination thereof, depending on the type of unsaturated monomer containing a sulfonic acid group or the like to be used.

[Chemical formula 4-1]

(4-1)

[Chemical formula 4-2]

(4-2)

[Chemical formula 4-3]

(4-3)

[Chemical formula 4-4]

(4-4)

In the formulas (4-1), (4-2), (4-3), and (4-4), $R^{11}$, $R^{12}$, $R^{13}$, and $R^{14}$ each is independently hydrogen or an alkyl group having from 1 to 4 carbon atoms. n is an integer of 2 to 4, and M represents a hydrogen atom, an alkali metal or ammonium group.

Further, the structural unit having a group containing sulfonic acid or a salt thereof, represented by the formula (3-2), is formed in the case of a sulfoalkylmalate represented below or the like as an unsaturated monomer containing a sulfonic acid.

[Chemical formula 5-1]

(5-1)

[Chemical formula 5-2]

(5-2)

In the above formulae (5-1) and (5-2), n is an integer of 2 to 4, and M represents a hydrogen atom, an alkali metal or an ammonium group.

Further, the structural unit having a group containing sulfonic acid or a salt thereof, represented by the formula (3-3), is formed with use of sulfoalkyl (meth)acrylamide shown below or the like as an unsaturated monomer having a group containing a sulfonic acid or a salt thereof.

[Chemical formula 5-3]

(5-3)

In the above formula (5-3), $R^{15}$ is hydrogen or an alkyl group having from 1 to 4 carbon atoms. n is an integer of 2 to 4, and M represents a hydrogen atom, an alkali metal or ammonium group.

Specific examples of the above-mentioned olefin sulfonic acid include olefin sulfonic acid such as vinyl sulfonic acid, allyl sulfonic acid, and methallyl sulfonic acid, or a salt thereof.

Specific examples of the sulfoalkylmalate include sodium sulfopropyl-2-ethylhexyl malate, sodium sulfopropyl-2-ethylhexyl malate, sodium sulfopropyl tridecyl malate, sodium sulfopropyl eicosyl malate and the like.

Specific examples of the sulfoalkyl (meth)acrylamide include sodium sulfomethylacrylamide, sodium sulfo-t-butylacrylamide, sodium sulfo-S-butyl acrylamide, sodium sulfo-t-butyl methacrylamide and the like.

Further, specific examples of the sulfoalkyl (meth)acrylate include sodium sulfoethyl acrylate and the like. In the case that an unsaturated monomer containing sulfonic acid groups is introduced by copolymerization, olefin sulfonic acid or a salt thereof is preferably chosen.

The saponification degree (measured in accordance with JIS K 6726) of the (A) PVA-based resin having a group containing sulfonic acid or a salt thereof used in the present invention is preferably from 75 to 99 mol %, more preferably from 80 to 95 mol %, and even more preferably from 85 to 90 mol %. Unduly low saponification degree tends to decrease the water solubility.

The average of polymerization degree (measured in accordance with JIS K 6726) of (A) the PVA-based resin having a group containing sulfonic acid or a salt thereof is preferably from 150 to 4000, more preferably from 250 to 1000, and further from 300 to 500.

An unduly low average of polymerization degree tends to be lowered in melt viscosity, which causes the dripping during fused deposition modeling. In addition, filamentous support material may be lowered in strength, resulting in being readily broken during printing. On the contrary, if unduly high average of polymerization degree increases the melt viscosity. A high melt viscosity of the filamentous support material becomes difficult for supplying at a high rate in fused deposition modeling. In addition, dissolubility of the support material in water in removal operation would be impaired.

Further, the (A) PVA-based resin having a group containing sulfonic acid or a salt thereof has a modification rate of preferably 0.01 to 10 mol %, more preferably from 0.1 to 5 mol %, and particularly preferably from 0.5 to 3 mol %. The modification rate is a percentage of the structural unit having a group containing sulfonic acid or a salt thereof based on the (A) PVA-based resin molecule. The (A) PVA-based resin having unduly low modification rate may be relatively lowered in amount of electron charge and the function as a protective colloid. This causes to impair compatibility with (B) biodegradable polyester. On the contrary, the (A) PVA-based resin having unduly high modification rate may be lowered in heat resistance of the support material. In addition, such PVA-based resin having a group containing sulfonic acid or a salt thereof may be difficult to be synthesized.

(A) The PVA-based resin having a group containing sulfonic acid or a salt thereof can be produced by (1) a method of copolymerizing a vinyl ester-based monomer and an unsaturated monomer containing a sulfonic acid and saponifying the obtained copolymer; (2) a method for polymerizing a vinyl ester-based monomer in the presence of a chain transfer agent, with a functional compound such as an alcohol, an aldehyde or a thiol each having a sulfonic acid or a salt thereof, and subsequently saponifying the obtained polymer; (3) a method of treating a PVA-based resin with bromine, iodine, etc., and then heating it with an aqueous solution of acidic sodium sulfite; (4) a method of heating PVA-based resin in a concentrated sulfuric acid aqueous solution; (5) a method for acetalizing a PVA-based resin having a group containing sulfonic acid or a salt thereof with an aldehyde compound and the like.

Of these, the method of (1), which comprises copolymerizing a vinyl ester-based monomer with an unsaturated monomer containing a sulfonic acid group, etc., and saponifying the obtained polymer, is preferable from the viewpoint of safety and workability during manufacturing.

Besides the vinyl ester monomer and the oxyalkylene-supplying vinyl monomer, another monomer may be copolymerized in the PVA-based resin having a group containing sulfonic acid or a salt thereof, at a ratio of 1 mol % or less. Examples of the other monomers include olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, 3,4-dihydroxy-1-butene and their derivatives such as acylated products; unsaturated acids such as acrylic acid, methacrylic acid, crotonic acid, maleic acid, maleic anhydride, itaconic acid, undecylenic acid, and salts, monoesters, or dialkyl esters thereof; nitriles such as acrylonitrile and meta-acrylonitrile; amides such as acrylamide and methacrylamide; olefin sulfonic acids such as ethylene sulfonic acid, allyl sulfonic acid, methallyl sulfonic acid or salts thereof; alkyl vinyl ethers; vinyl compounds such as dimethylallyl vinyl ketone, N-vinylpyrrolidone, vinyl chloride, vinylethylene carbonate, 2,2-dialkyl-4-vinyl-1,3-dioxolane, and glycerin monoallyl ether; substituted vinyl acetates such as isopropenyl acetate and 1-methoxyvinyl acetate, vinylidene chloride, 1,4-diacetoxy-2-butene, 1,4-dihydroxy-2-butene, vinylene carbonate and the like.

The method of copolymerization of the vinyl ester monomer and the unsaturated monomer containing a sulfonic acid group or the like, and optionally other monomers according to needs, is not particularly limited. A known methods such as bulk polymerization, solution polymerization, suspension polymerization, dispersion polymerization, or emulsion polymerization can be adopted, but solution polymerization is typically adopted.

The method of charging the monomers for copolymerization is not particularly limited, and an appropriate method such as batch charging, split charging, continuous charging and the like may be adopted.

Typical examples of the solvent used in such copolymerization include lower alcohols such as methanol, ethanol, isopropyl alcohol, n-propanol and butanol; ketones such as acetone and methyl ethyl ketone. Of these, alcohols having from 1 to 3 carbon atoms, in particular, methanol is preferably used for industry.

The amount of the solvent used may be appropriately determined depending on an intended polymerization degree with taking into consideration the chain transfer constant of the solvent. For instance, in the case of methanol, the amount of methanol is set within the range of 0.01 to 10 (mass ratio), preferably about from 0.05 to 3 (mass ratio), in term of S (solvent)/M (Polymer) ratio.

A polymerization catalyst is used in the copolymerization. Examples of the polymerization catalyst include known radical polymerization catalysts such as azobisisobutyronitrile, acetyl peroxide, benzoyl peroxide and lauryl peroxide, and low temperature active radical polymerization catalysts such as azobisdimethylvaleronitrile and azobismethoxydimethylvaleronitrile. An appropriate amount of the polymerization catalyst is selected according to an intended polymerization degree, which depends on the type of catalyst. In the case of azoisobutyronitrile or acetyl peroxide, an appropriate amount may be preferably determined from the range between 0.01 and 1.0 mol %, particularly between 0.02 and 0.5 mol %, with respect to the vinyl ester-based monomer.

The reaction temperature of the copolymerization may be determined from the range about between 30° C. and a boiling point, more specifically between 35 and 150° C., preferably between 40 and 75° C., depending on the solvent and pressure used.

Then, the obtained copolymer is saponified. The saponification is carried out by dissolving the copolymer in an alcohol or a hydrous alcohol in the presence of an alkali catalyst or an acid catalyst.

Examples of the alcohol include lower alcohols such as methanol, ethanol, propanol and tert-butanol, and among them, alcohols having from 1 to 3 carbon atoms, particularly methanol are preferably used. The concentration of the copolymer in the alcohol is appropriately selected depending on a viscosity of the system, but is usually selected from the range of 10 to 60% by mass. Examples of catalysts used for saponification include hydroxides of alkali metals such as sodium hydroxide, potassium hydroxide, sodium methylate, sodium ethylate, potassium methylate and lithium methylate, and alkaline catalyst such as alcoholate; acid catalyst such as sulfuric acid, chloric acid, nitric acid, metasulfonic acid, zeolites, cation exchange resin and the like.

An appropriate amount of the saponification catalyst is selected depending on the saponification method, an intended saponification degree, and so on. In the case of an alkaline catalyst, a suitable amount may be selected from the range between 0.1 and 30 mmol, preferably between 2 and 15 mmol, with respect to 1 mol of monomer as the total amount of unsaturated vinyl ester monomer and sulfonic acid group or the like-containing unsaturated monomer.

The reaction temperature of the saponification is not particularly limited, but is preferably from 10 to 60° C. (particularly from 20 to 50° C.).

Thus, the (A) PVA-based resin having a group containing sulfonic acid or a salt thereof used in the invention can be obtained.

Na acetate may be contained as a by-product in the synthesis of the PVA-based resin having a group containing sulfonic acid or a salt thereof by an above-mentioned method.

The content of sodium acetate is 0.1 part by weight or more, preferably 0.3 part by weight or more, more preferably 0.5 part by weight or more, but 2.0 part by weight or less, preferably 1.5 parts by weight or less with respect to 100 parts by weight of (A) PVA-based resin having a group containing sulfonic acid or a salt thereof. The presence of sodium acetate at an amount to this extent is preferable because a filamentous support material may be decomposed slightly at the time of being melted to contact a model material, so that the adhesion to the model (or model material) can be improved. If the amount of sodium acetate is too low, the adhesion to the model (model material) tends to be lowered. On the other hand, the PVA-based resin having an unduly high content of sodium acetate would be impaired in thermal stability. This means that, the portion of the support material which in contact with the model material having a high temperature may be impaired in quality or deteriorated at a portion of the obtained fused modeled structure during the process of fused deposition modeling. In a worse case, the support material may be decomposed and foamed during the process of fused deposition modeling.

(B) Biodegradable Polyester

The biodegradable polyester used in the invention refers to a polyester-based resin meeting the requirements regarding biodegradability prescribed in any one of ISO 14851, ISO 14855, ISO 9408, ISO 9439, ISO 10707, JIS K 6950, JIS K 6951, JIS K 6953 or JIS K 6955.

The polyester-based resin capable of satisfying biodegradability has essential units that are an aliphatic diol unit represented by the formula (11) and an aliphatic dicarboxylic acid unit represented by the formula (12), and further contains the aromatic dicarboxylic acid unit represented by the formula (13) and the hydroxycarboxylic acid-derived unit represented by the formula (14), depending on the desirable properties such as biodegradability, mechanical properties, or melt moldability.

[Chemical formula 11]

(11)

[Chemical formula 12]

(12)

[Chemical formula 13]

(13)

[Chemical formula 14]

(14)

In the formulae (11), (12) and (14), p, q and r each is independently integers of 2 to 10, preferably 2 to 6. In the formula (13), Ar represents an aromatic ring.

The aliphatic diol providing the formula (11) usually has 2 or more but 10 or less carbon atoms, and examples thereof include ethylene glycol, 1,3-propanediol, 1,4-butanediol, and 1,4-cyclohexanedimethanol. Of these, diols having 2 or more and 4 or less carbon atoms are preferable, ethylene glycol and 1,4-butanediol are more preferable, and 1,4-butanediol is particularly preferable.

The aliphatic dicarboxylic acid providing the formula (12) usually has 2 or more but 10 or less carbon atoms, and examples thereof include succinic acid, adipic acid, suberic acid, sebacic acid, and dodecanedioic acid. Of these, adipic acid is preferable.

Examples of the aromatic dicarboxylic acid providing the formula (13) include terephthalic acid, isophthalic acid, naphthalenedicarboxylic acid and the like. Of these, terephthalic acid and isophthalic acid are preferable, and terephthalic acid is particularly preferable. In addition, an aromatic dicarboxylic acid in which the aromatic ring is partially substituted with a sulfonate may be also included.

Examples of the hydroxycarboxylic acid providing the formula (14) include 4-hydroxybutyric acid, 5-hydroxyvaleric acid, 6-hydroxycaproic acid and the like.

Regarding the constituent units of the biodegradable polyester (B) used in the invention, aliphatic diol unit, aliphatic dicarboxylic acid unit, and aromatic dicarboxylic acid are contained. With respect to each of these units, not only one type unit but also a combination of different type unit may be contained, in the biodegradable polyester (B).

In addition to the above-listed diol unit and dicarboxylic acid unit, the biodegradable polyester (B) may further contain a dicarboxylic acid unit having q and r less than 2 respectively, for example, a structural unit derived from oxalic acid, malonic acid, glycolic acid, lactic acid and the like, as long as the biodegradability of the polyester (B) is not impaired.

Specific examples of the (B) biodegradable polyester used in the present invention include a polyester whose basic unit is 1,4-butanediol such as polybutylene succinate (PBS), polybutylene succinate adipate (PBSA), polybutylene succinate lactate (PBSL), and polybutylene adipate terephthalate (PBAT), and polyethylene succinate (PES).

Commercially available biodegradable polyester, such as "Ecoflex" (product name) manufactured by BASF, whose main ingredient is a condensed polymer of adipic acid/terephthalic acid and 1,4-butanediol, "GS-PLA" manufactured by Mitsubishi Chemical Corporation whose main ingredient is a condensed polymer of succinic acid/1,4-butanediol/lactic acid, may be used. Besides them, Bionore (product name) manufactured by Showa High Polymer Co., Ltd., Lunare (product name) manufactured by Nippon Catalyst Co., Ltd., Biomax® manufactured by DuPont Co., Ltd., EasterBio® manufactured by Eastman Chemical Co., Ltd., may also be used.

As the (B) biodegradable polyester used in the invention, a biodegradable polyester having from 40 to 80 mol %, preferably from 50 to 70 mol % of aliphatic dicarboxylic acid unit is preferred, the percentage is on the basis of total dicarboxylic acid units contained in the polyester.

Aliphatic dicarboic acid unit and aromatic dicarboxylic acid unit may be contained as the dicarboxylic acid unit. When the percentage of the aliphatic dicarboic acid unit is set in the above-mentioned range, the (B) biodegradable polyester may be enhanced in mechanical strength, particularly flexibility, tear strength, and Impact resistance properties, thereby the biodegradable polyester in the form of filament may be preferably used as a support material.

The melt flow rate (MFR) of the (B) biodegradable polyester as measured at 190° C. under a load of 2.16 kg is usually 1.0 g/10 minutes or more, preferably 2.0 g/10 minutes or more, and most preferably 3.0 g/10 minutes or more, but usually 6.0 g/10 minutes or less, preferably 5.0 g/10 minutes or less, and more preferably 4.0 g/10 minutes or less. The MFR less than 1.0 g/10 minutes is not sufficient fluidity in molten state. This is not preferred because a supplying rate of the support material is not matched with a modeling rate from the model material during fused deposition modeling. On the other hand, the MFR larger than 6.0 g/10 minutes makes a support material drip easily from the orifice during fused deposition modeling.

The weight average molecular weight of the (B) biodegradable polyester is usually from 5000 to 50000, preferably from 5500 to 40000, and particularly preferably from 6000 to 30000. An unduly high weight average molecular weight makes the melt viscosity high. When a filamentous support material is formed by melt-kneading, the extruded filamentous support material is likely to fluctuate due to high melt viscosity, and the diameter of the filament may not be fixed. On the other hand, (B) biodegradable polyester having an unduly low weight average molecular weight readily bleeds on the filament surface during melt-kneading, and the bled polyester may still remain as a water insoluble sheath-like matter after dissolving in water to remove the support structure from the fused deposition modeled structure. The remained water insoluble matter may adhere on the model structure after removing support structure or may cause clog in wastewater treatment.

The content of the (B) biodegradable polyester in the support material is preferably from 5 to 100 parts by weight, more preferably from 10 to 60 parts by weight, and further preferably from 20 to 50 parts by weight with respect to 100 parts by weight of the (A) PVA-based resin. A filamentous support material having too low content of the (B) biodegradable polyester is insufficient in flexibility, resulting in readily broken during fused deposition modeling process. Moreover, in the fused deposition modeling process, a subsequent layer of the support material is laid on the previous layer with considerably low adhesion. On the other hand, the support material having too high content ratio of (B) biodegradable polyester may impart water solubility, and such support material is not willing to form a sea-island structure in which the (A) PVA-based resin having a group containing sulfonic acid or a salt thereof is sea component. Moreover, the island of the (B) biodegradable polyester would not be finely dispersed in the sea of the component (A). These phenomena may raise a problem associated with wastewater treatment in the case that the support material is removed by washing the resulting fused deposition modeled structure with use of water.

(C) Other Ingredients
(C-1) Other PVA-Based Resins

The support material of the invention may contain another PVA-based resin which is a PVA-based resin other than the (A) PVA-based resin having a group containing a sulfonic acid or a salt thereof within a range that the compatibility of (A) PVA-based resin with the biodegradable polyester (B) is not impaired, specifically 30% by weight or less, preferably 10% by weight or less of the entire PVA-based resin. The another PVA-based resin includes, for example, an unmodified PVA-based resin, another modified PVA-based resin, or the like.

(C-2) Filler

The support material of the present invention may contain a filler from the viewpoint of the strength of the support material. A preferable filler is biodegradable. Examples of the biodegradable filler include starch, cellulose, biodegradable plastic and the like. The average particle size of the filler is usually from 0.1 to 50 µm, more preferably from 5 to 30 µm, and particularly preferably from 10 to 20 µm. Unduly small filler may be hardly incorporated into the resin during kneading operation. Unduly large filler may provide a support structure with a rough surface and insufficient strength. In addition, such relatively large filler may exist as a dispersoid in a wastewater (PVA-based resin aqueous solution), therefore should be separated and removed from the wastewater generated in washing process.

Hereinafter, the average particle diameter refers to a particle diameter D50 measured by the laser diffraction method.

The content of the filler in the support material is preferably from 0.3 to 40% by weight, more preferably from 2 to 30% by weight, and particularly preferably from 5 to 10% by weight. If the content is too low, the filler may not give a desirable effect. if the content is too high, the filler may impair the smoothness of the surface of the support structure and lower the strength of the support structure.

(C-3) Another Additive

The support material of the present invention may contain a plasticizer, however, a relatively low content of the plasticizer is required from the viewpoint of molding stability. A preferable content is 20% by weight or less, particularly 10% by weight or less, more particularly 1% by weight or less, and further more particularly 0.1% by weight or less.

In addition to the above-mentioned ingredients, a known additive such as antioxidant, colorant, antistatic agent, ultraviolet absorber, lubricant, or another thermoplastic resin may be added according to needs. In the case that an additive is contained, the additive is preferably biodegradable so as not to impair disposability and environmental compatibility of a support material of the invention.

<Support Material for Fused Deposition Modeling and its Manufacturing Method>

A support material for fused deposition molding (hereinafter, may be simply referred to as a support material) of the present invention contains (A) a PVA-based resin having a group containing sulfonic acid or a salt thereof and (B) a biodegradable polyester.

A support material of the invention may be provided as a pellet of a composition obtained by adding a predetermined amount of the ingredients, kneading in a heat-melted state with a twin-screw extruder to a homogenous mixture and pelletizing it. Preferably, a support material is provided as a filamentous support material wound around a reel, which is produced by melt-kneading pellets of the composition of support material, extruding the kneaded composition into a filament with a single-screw extruder and being cooled, followed by winding the filament around a reel.

Specifically, a pelletized support material composition is melt-kneaded with the twin-screw extruder and extruded in the form of filament having a diameter of 1.5 to 3.0 mm through a single- or multi-hole strand die of the single-screw extruder. The extruded filamentous support material is solidified by air cooling, and then wound around a reel to be provided in a marketplace. Such a filamentous support material is convenient because the filamentous support material can be fed out together with a model material from the head for a fused deposition modeling. A filamentous support material needs to have a flexibility and toughness sufficient to sustain the reel winding operation, and have a rigidity sufficient for delivering to the head without delay during fused deposition modeling process. The support material of the invention can meet these requirements.

Thus, produced support material comprising (A) a PVA-based resin having a group containing sulfonic acid or a salt thereof and (B) a biodegradable polyester has a phase-separated structure in which one component is finely dispersed in a matrix consisting of the other component. Preferably, the support material has a sea-island structure in which the (A) PVA-based resin having a group containing sulfonic acid or a salt thereof is present as a sea component, and (B) biodegradable polyester is finely dispersed as an island component. The size of the domain consisting of the (B) biodegradable polyester is in the range of about from 0.05 to 2 µm, preferably from 0.1 to 1.0 µm, more preferably from 0.1 to 0.5 µm. Not less than 90% to all domains in a field of 0.01 mm×0.01 mm observed by SEM (electronic microscope) under the following conditions, have a size falling in the above-mentioned range.

Instrument: JSM-6060LA (manufactured by JEOL Ltd.)
Acceleration voltage: 5 kV
Spot size: 30
Stage angle: 0 degree
Observation image: Secondary electron image
Pretreatment: After etching with chloroform (60° C.×2 hr), and vacuum drying for 24 hours

[Manufacturing Method of Fused Deposition Modeled Structure and Three-Dimensional Object]

A fused deposition modeled structure is obtained in the manufacture of a target model that is a three-dimensional object having a desired shape. A support structure made of a support material of the invention is integrally configured with supporting a model structure (target model) in the fused deposition modeled structure.

A method of manufacturing a three-dimensional object of the invention is a method for forming a target model that is a three-dimensional object having a desired shape by a fused deposition modeling in which an inventive support material is used. The method comprises extruding the support material and a model material used for the target model both in molten state, and solidifying them to form a fused deposition modeled structure; and bringing the fused deposition modeled structure into contact with water.

A constituent material of a model material to which the support material of the present invention can be applied is a thermoplastic resin that can be melt-molded and a resin composition thereof. For example, polylactic acid (PLA), acrylonitrile-butadiene-styrene copolymer (ABS), polyamide (PA), polycarbonate (PC), polyethylene terephthalate (PET), glycol-modified polyethylene terephthalate (PETG), polyhydroxyalkanoate (PHA), wood-filled composite, metal-filled composite, carbon fiber-filled composite, polyvinyl butyral (PVB), thermoplastic elastomer (TPE), thermoplastic polyurethane (TPU), polyolefin, polypropylene (PP), acrylonitrile styrene acrylate (ASA), polyacrylate, polymethacrylate, polystyrene (PS), polyoxymethylene (POM), and mixtures thereof may be used.

The support material of the present invention is particularly excellent as a support material for these model materials because of their excellent adhesion to PLA, ABS, PA, PETG, and PC.

An apparatus used in an inventive method of manufacturing a three-dimensional object may be a fused deposition modeling type apparatus equipped with multi nozzle heads for extruding molten model material and molten support material independently. The fused deposition modeling type apparatus includes a dual head type FDM type 3D printer such as Creator manufactured by FlashForge, Eagleed manufactured by Rays Enterprises, MBot Grid II manufactured by 3D Systems, NJB-200W manufactured by Ninjabot, and EVO manufactured by Airwolf.

In the case of a fused deposition modeling printer, a model material composed of the above-mentioned constituent materials is usually provided in a state of being formed into a strand or a filament and wound on a reel like a support material. The strands or filaments of the model material and the support material are supplied to separate heads of the fused deposition modeling apparatus, subsequently they are heated and melted at their nozzle heads, so as to be placed onto a print bed to form a structure layer by layer.

Materials are melted at their heads each having a temperature of usually 150 to 300° C., and extruded at a pressure of 200 to 1000 psi. The stacking pitch is usually from 100 to 350 μm.

A melt-extruded support material and model material are solidified by cooling, and a subsequently melt-extruded support material and model material are laid on top of the previous layer of the solidified support material and model material. Thus produced structure or fused deposition modeled structure includes a target model made of the model material.

The step of bringing a fused deposition modeled structure into contact with water is a process of removing the support structure by use of water from the fused deposition modeled structure composed of a target model and the support structure. This removal process may be conducted by immersing the fused deposition modeled structure in water or warm water, or by washing the fused deposition modeled structure with running water. In order to shorten the immersion period for dissolving the support structure, the water may be stirred or exposed to a ultrasonic wave. The water used in the removal process may have a temperature of preferably about 25 to 80° C. An amount of water or warm water used for the dissolution is about from 10 to 10000 times as much as the weight of the support structure.

Even a three-dimensional object (target model) having a complex shape with overhangs can be obtained by the removal of the support structure from the fused deposition modeled structure.

In the wastewater (PVA-based resin aqueous solution) generated by washing the fused deposition modeled structure with water, the water-insoluble component or (B) biodegradable polyester is finely dispersed as a dispersoid. However, the wastewater (PVA-based resin aqueous solution) generated through washing process with water is likely a suspension in which (B) biodegradable polyester is dispersed in the form of particle having an average particle size of 0.1 to 5 μm, preferably from 0.2 to 2 μm. Therefore, it is possible to dispose the wastewater directly without some special separation treatment. Since wastewater can be discharged, the removal process may be conducted with using a relatively large amount of water (warm water), for example, conducted with use of running water.

EXAMPLES

Hereinafter, the present invention will be described in more detail with reference to examples, but the present invention is not limited to the following examples as long as the gist of the invention is not exceeded. In the example, "part" means a weight basis.

[Methods for Measurement and Evaluation]
1. Characteristics of Modified PVA-Based Resin
(1) Saponification Degree It was determined by analysis of alkali consumption required for hydrolysis of the residual vinyl acetate unit. In the case of the side chain 1,2-diol-modified PVA-based resin, the saponification degree was determined by analysis of alkali consumption required for hydrolysis of the residual vinyl acetate unit and the structural unit of 3,4-diacetoxy-1-butene.

(2) Polymerization Degree

A number average polymerization degree is adopted for the polymerization degree. The number average polymerization degree is calculated based on the viscosity (mPa·S) of 4% aqueous solution at 20° C. measured according to JIS K6726.

(3) Modification Rate

The amount of modifying group (structural unit having a group containing sulfonic acid or a salt thereof, or a side chain 1,2-diol-containing group) was calculated from the integrated value measured by $^1$H-NMR (300 MHz proton NMR, d6-DMSO solution, tetramethylsilane as an internal standard substance, 50° C.).

2. Characteristics of Support Material (1) Domain Size of (B) Biodegradable Polyester The prepared support material was observed by SEM (observation field of 0.01 mm×0.01 mm) under the following conditions, and the domain size of (B) biodegradable polyester domain (PBAT domain) was measured.

Instrument: JSM-6060LA (manufactured by JEOL Ltd.)
Acceleration voltage: 5 kV
Spot size: 30
Stage angle: 0 degree
Observation image: Secondary electron image
Pretreatment: etching with chloroform (60° C.×2 hr), subsequently vacuum drying for 24 hours (2) Deviation of Filament Fluctuation A prepared filamentous support material (diameter 2.85 mm) was measured at 15 points at intervals of 1 m in longitudinal direction with respect to the diameter, and deviations from a predetermined diameter of 2.85 mm was calculated. The smaller the deviation, the more stable diameter the filamentous support material has.

3. Adhesion to Model Material

As a model material, polylactic acid (PLA), ABS resin (ABS), polyamide (PA), glycol-modified polyethylene terephthalate (PETG), or polycarbonate (PC) were used for evaluation of the adhesion of the filamentous support material to these model materials as follows.

Figure 1:
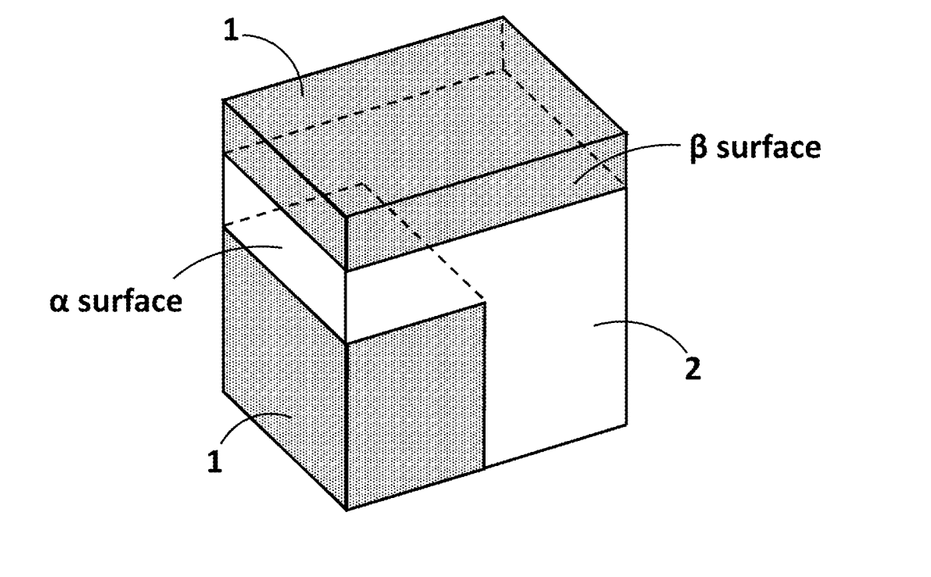
FIG. 1 depicts a configuration of a fused deposition modeled structure to be formed for measurement in Example.

The above prepared support material and the above four types of model materials were set in the nozzle head in an FDM type dual head 3D printer (EVO manufactured by Airwolf3D), for forming a fused deposition modeled structure shown in FIG. 1. In FIG. 1, a formed support structure 1 is made of a support material, and an L-shaped model structure 2 is made of a model material. A produced fused deposition modeled structure was observed with respect to modeled states. Moreover, the fused deposition modeled structure was separated to a support structure and a model structure by peeling off at a α surface or β surface by hand, for the purpose of the evaluation of the adhesion on respective surfaces. The α surface is a layer of the model material laminated on the formed object made of the support material, and the β surface is a layer of the support material laminated on the formed object made of the model material.

The adhesion was evaluated according to the following criteria A, B, or C. If the separation by peeling is easily done by hand, fused deposition modeling at relatively high speed would be difficult.

A: Fused deposition modeling is possible, and the obtained fused deposition modeled structure is not separated by peeling off by hand.

B: Fused deposition modeling is possible, but the obtained fused deposition modeled structure may be easily separated by peeling off by hand.

C: Fused deposition modeling has difficulties and would be failed.

4. Removability by Washing with Water (1) Water Solubility (Complete Dissolution Time)

5 g of pellets having a length of 2 mm obtained by cutting the prepared support material were put in a 90-mesh wire mesh cage. The wire mesh cage was immersed in a 500 ml-hot water bath having a temperature of 40° C. under being stirred (300 rpm). A time until the pellets in the wire mesh cage are not visible due to dissolution is measured. The time is called as complete dissolution time (unit: minutes). The shorter the complete dissolution time, the better the water solubility.

(2) Generation of Agglomerates

If agglomerates remain as an insoluble matter on a wire mesh used in the water solubility test even after 2 hours, the test result is assessed as generation of agglomerates. If agglomerates are not visibly recognized on the wire mesh, the test result is assessed as no generation of agglomerates.

[Manufacturing of Modified PVA-Based Resin]

(1) PVA-based resin having a group containing sulfonic acid or a salt thereof 1 (hereinafter referred to as "sulfonic acid-modified PVA-based resin 1")

A reactor equipped with a reflux condenser, a dropping funnel, and a stirrer was charged with 1000 parts by weight of vinyl acetate, 422 parts by weight of methanol, and 62 parts by weight of sodium allylsulfonate (corresponding to 3.7 mol % with respect to vinyl acetate, and chlorine content 0.26%), and 0.072 mol % (with respect to the charged vinyl acetate) of azobisisobutyronitrile. Polymerization was carried out while stirring, and rising the temperature and reflexing the mixture under blowing nitrogen gas.

During the polymerization, azobisisobutyronitrile was added 4 times by 0.072 mol % (with respect to the charged vinyl acetate). When the polymerization rate of vinyl acetate reached 96.4%, the polymerization was terminated by adding 0.1 part by weight of m-dinitrobenzene. Subsequently, unreacted vinyl acetate monomer was removed from the reaction system by blowing methanol vapor to obtain a methanol solution of the copolymer.

The obtained methanol solution containing the copolymer was diluted with methanol to adjust the concentration to 55% and charged into a kneader. While keeping the solution temperature at 35° C., a methanol solution of sodium hydroxide (sodium concentration of 2%) was added at a ratio of 8 mmol to 1 mol of vinyl acetate structural unit in the copolymer for saponification. As the saponification proceeded, the particulate saponified product was precipitated, the particulate saponified product was separated by filtration. The separated particles were thoroughly washed with methanol and then dried in a hot air dryer to provide a composition which contains not only a PVA-based resin having a group containing sulfonic acid or a salt thereof but also chlorine. The content of sodium acetate was 1.3 parts with respect to 100 parts by weight of the PVA-based resin having a group containing sulfonic acid or a salt thereof.

The obtained sulfonic acid-modified PVA-based resin 1 has a saponification degree of 87.3 mol % and a number average polymerization degree of 250, and the amount of the structural unit having a group containing sulfonic acid or a salt thereof, or modification rate, was 2.7 mol %.

(2) PVA-based resins 2, 3, 4, and 5, each having a group containing sulfonic acid or a salt thereof (hereinafter referred to as "sulfonic acid-modified PVA-based resin 2, 3, 4, or 5")

In the production of the sulfonic acid-modified PVA-based resin 1, the amount of the charged sodium allylsulfonate, the polymerization time, or time for washing the obtained PVA-based resin having a group sulfonic acid or a salt thereof with methanol was changed to prepare the following sulfonic acid-modified PVA-based resins 2, 3, 4, and 5. They differed in the modification rate, the polymerization degree, and the amount of sodium acetate contained in the resin.

Sulfonic Acid-Modified PVA-Based Resin 2

Modification rate of 1.6 mol %, number average polymerization degree of 370, and sodium acetate content of 0.9 parts per 100 parts of PVA-based resin;

Sulfonic Acid-Modified PVA-Based Resin 3

Modification rate of 1.1 mol %, number average polymerization degree of 370, and sodium acetate content of 0.9 part per 100 parts of PVA-based resin;

Sulfonic Acid-Modified PVA-Based Resin 4

Modification rate of 1.1 mol %, number average polymerization degree of 370, and sodium acetate content of 0.2 part per 100 parts of PVA-based resin; and Sulfonic Acid-Modified PVA-Based Resin 5

Modification rate of 0.3 mol %, number average polymerization degree of 370, and sodium acetate content of 0.8 part per 100 parts of PVA-based resin.

(3) Side Chain 1,2-Diol-Modified PVA-Based Resin

Into a reactor equipped with a reflux condenser, a dropping funnel, and a stirrer, 85 parts of vinyl acetate (corresponding to an initial concentration of 10% based on the total charged amount), 460 parts of methanol, and 7.6 parts of 3,4-diacetoxy-1-butene were charged. After the addition of 0.32 parts of azobisisobutyronitrile to the reactor, the reactor was heated to initiate polymerization with stirring and blowing nitrogen gas. 0.5 hours after the initiation of polymerization, 765 parts of vinyl acetate was added dropwise over the period of 8 hours (drop rate 95.6 parts/hr). 0.2 parts of azobisisobutyronitrile at the time of 2.5 hours and another 0.2 parts at the time of 4.5 hours after the start of polymerization, respectively. When the polymerization rate of vinyl acetate reached 85%, a predetermined amount of m-dinitrobenzene was added to terminate the polymerization, and subsequently, the unreacted vinyl acetate monomer was removed from the reaction system by distillation while blowing methanol vapor, thereby a methanol solution of the copolymer was obtained.

Then, the above solution was diluted with methanol to adjust the solid content concentration to 50%. The diluted methanol solution was charged into the kneader for saponification. The saponification was conducted by adding methanol solution having 2% sodium content of sodium hydroxide at a ratio of 9 mmol to 1 mol of the total amount of vinyl acetate structural unit and 3,4-diacetoxy-1-butene structural unit in the copolymer, while keeping the solution temperature at 35° C. As the saponification proceeded, the saponified product was precipitated. At the time that the saponified product became particulate, a 2% methanol solution was further added at a rate of 4 mmol to 1 mol of the total amount of vinyl acetate structural unit and 3,4-diacetoxy-1-butene structural unit. Thereafter, acetic acid for neutralization was added at an amount of 0.8 equivalent of sodium hydroxide. The saponified product was separated by filtration and washed well with methanol, and dried in a hot air dryer. Thereby, a PVA-based resin having a 1,2-diol structure in the side chain, which is a side chain 1,2-diol-modified PVA resin, was obtained. The content of sodium acetate was 1.3 parts with respect to 100 parts by weight of the side chain 1,2-diol-modified PVA-based resin.

The obtained side chain 1,2-diol-modified PVA-based resin had 86 mol % in saponification degree, 380 in number average polymerization degree, and 4 mol % in a content of side chain 1,2-diol structural units.

[Production of Support Materials]

Support Material Nos. 1 Through 6:

100 parts of one of the sulfonic acid-modified PVA-based resins 1 through 5 produced above and PBAT ("Ecoflex 01200" manufactured by BASF) as (B) biodegradable polyester were mixed at an amount ratio shown in Table 1. The obtained blend was supplied to a twin-screw extruder to prepare a pellet-shaped composition. The pellets were melt-kneaded using the following single-screw extruder, extruded into filaments having a diameter of 2.85 mm, air-cooled on a belt, and wound on a reel to obtain filamentous support materials. Single-screw extruder ("SZW20GT-24MG-STD" by TECHNOVEL CORPORATION): 20 mmϕ, UD=24, Extrusion temperature pattern: C1/C2/C3/H/D=190/210/220/220/220° C.

Rotation speed: 40 rpm

Discharge rate: 1.0 kg/hour

Support Material Nos. 7 and 8:

100 parts of the side chain 1,2-diol-modified PVA-based resin synthesized above and the biodegradable polyester ("Ecoflex 01200" manufacture by BASF) were dry-blended at the ratio shown in Table 1. A filamentous support material was prepared by using the blended material in the same manner as the support material No. 1.

The support material Nos. 1 through 8 prepared above were evaluated with respect to dispersibility of the (B) biodegradable polyester (PBAT domain size), deviation of filament diameter, adhesion to the model material, and removability by washing with water according to the early mentioned measurement and evaluation method. The results are shown in Table 2.

TABLE 1

| support material No | PVA modification type | modified PVA | | | | biodegradable polyester |
|---|---|---|---|---|---|---|
| | | modification rate (mol %) | saponification degree (mol %) | number average polymerization degree | sodium acetate content per 100 parts PVA (part) | mixed amount per 100 parts PVA (part) |
| 1 | sulfonic acid-modified 1 | 2.7 | 87.3 | 250 | 1.3 | 43 |
| 2 | sulfonic acid-modified 2 | 1.6 | 87.3 | 370 | 0.9 | 43 |
| 3 | sulfonic acid-modified 3 | 1.1 | 87.3 | 370 | 0.8 | 43 |
| 4 | sulfonic acid-modified 3 | 1.1 | 87.3 | 370 | 0.8 | 67 |
| 5 | sulfonic acid-modified 4 | 1.1 | 87.3 | 370 | 0.2 | 43 |
| 6 | sulfonic acid-modified 5 | 0.3 | 87.3 | 340 | 0.8 | 43 |
| 7 | side chain 1,2-diol | 4.0 | 86.0 | 370 | 1.3 | 43 |
| 8 | side chain 1,2-diol | 4.0 | 86.0 | 370 | 1.3 | 67 |

TABLE 2

| support material | | | adhesion to model material | | | | | | | | | | removability by washing with water | |
| --- | --- | --- | --- | --- | --- | --- | --- | --- | --- | --- | --- | --- | --- | --- |
| | | | PLA | | ABS | | PA | | PETG | | PC | | | |
| support material No | PBAT domain (μm) | deviation of filament diameter | α surface | β surface | α surface | β surface | α surface | β surface | α surface | β surface | α surface | β surface | generation of agglomerates | dissolution time (min) |
| 1 | 0.1-0.5 | 2.85 ± 0.05 | A | A | A | A | A | A | A | B | A | — | no generation | 27 |
| 2 | 0.1-0.5 | 2.85 ± 0.05 | — | A | — | A | — | A | — | A | — | — | no generation | 28 |
| 3 | 0.1-0.5 | 2.85 ± 0.05 | A | A | A | B | A | A | A | B | B | — | no generation | 33 |
| 4 | 0.1-0.5 | 2.85 ± 0.07 | A | A | A | A | A | A | A | A | A | — | no generation | 42 |
| 5 | 0.1-0.5 | 2.85 ± 0.05 | B | B | B | C | A | B | A | C | C | — | no generation | 32 |
| 6 | 1.2-2.5 | 2.85 ± 0.07 | — | B | — | C | — | B | — | C | — | — | generation | 50 |
| 7 | 1.0-3.0 | 2.85 ± 0.1 | B | B | B | C | A | C | B | C | C | — | generation | 52 |
| 8 | 1.0-10.0 | 2.85 ± 0.5 | — | C | — | C | — | C | — | C | — | — | generation | >60 |

[—]: no measurement

As can be seen from Table 2, support material Nos. 1-6, which employed PVA-based resin having a group containing sulfonic acid or a salt thereof (hereinafter abbreviated as "sulfonic acid-modified PVA-based resin") as a modified PVA-based resin, exhibited more finely dispersed state of the biodegradable polyester, as compared with the support material Nos. 7 and 8 employing the side chain 1,2-diol modified PVA resin. As for the removability by washing with water, the support material Nos. 1 through 5 each employing the sulfonic acid-modified PVA-based resin did not generate agglomerates, and the complete dissolution time was shorter than that of the support material using the side chain 1,2-diol-modified PVA resin (Nos. 7 and 8).

In the case that the modification rate of the sulfonic acid-modified PVA-based resin was 0.3 mol % (No. 6), an intended removability was not achieved because of insufficient effect of the modification with sulfonic acid.

In addition, it was seen from the comparison between Nos. 1-6 and Nos. 7 and 8, that a sulfonic acid-modified PVA-based resin could provide a filamentous support material having more stable diameter of filament than the side chain 1,2-diol-modified PVA.

Also, regarding the adhesion to the model material, the support material Nos. 7 and 8 employing the side chain 1,2-diol-modified PVA-based resin was inferior to that employing the sulfonic acid-modified PVA-based resin on the 13 surface. In particular, adhesion of Nos. 7 and 8 to model materials such as ABS, PA, PETG and PC, which restricts a kind of model materials to be used in combination with the support material employing side chain 1,2-diol modified PVA-based resin. While the support material Nos. 1-5, especially Nos. 1-4, employing the sulfonic acid-modified PVA-based resin have excellent adhesion to various model materials including PLA, ABS, PA, PETG and PC, which means excellent in versatility. Therefore, the support material employing the sulfonic acid-modified PVA-based resin may be applied to a variety of model materials used in fused deposition modeling.

Comparison of the sulfonic acid-modified PVA-based resins between No. 3 and No. 5 proved that the α surface and the β surface might exhibit a different adhesion from each other in the case of unduly low content of sodium acetate contained in their sulfonic acid-modified PVA-based resins, even if they have an identical modification rate, saponification degree, and polymerization degree. It is preferable to adjust the amount of sodium acetate from 0.5 to 2.0 parts by weight per 100 parts by weight of the PVA-based resin, in the case of supporting to form a model having a having a complicated shape.

INDUSTRIAL APPLICABILITY

Since the support material for fused deposition modeling of the present invention has excellent water solubility. And insoluble matter contained in the support material can turn a very small and biodegradable residue in the wastewater, so the wastewater may be drained as it is. Thus, washing operation of the fused deposition modeled structure and removal treatment of the support material are not troublesome, and wastewater is environmentally friendly. For these reasons, the inventive support material is useful for a support material which is formed temporarily and discarded.

In addition, since the support material exhibits excellent adhesion to various materials, the support material can be applied to a wide range of materials as a support material.

The invention claimed is:

1. A support material for fused deposition modeling comprising
    (A) polyvinyl alcohol-based resin having a group containing sulfonic acid or a salt thereof, and
    (B) biodegradable polyester,
    wherein the (A) polyvinyl alcohol-based resin having a group containing sulfonic acid or a salt thereof further comprises sodium acetate, and
    wherein the content of sodium acetate is from 0.5 to 2.0 parts by weight with respect to 100 parts by weight of (A) polyvinyl alcohol-based resin having a group containing sulfonic acid or a salt thereof.

2. The support material for fused deposition modeling according to claim 1, wherein the (A) polyvinyl alcohol-based resin having a group containing sulfonic acid or a salt thereof is a polyvinyl alcohol-based resin having a structural unit represented by the following formula (3-1), (3-2), or (3-3) as the group containing sulfonic acid or salt thereof:

wherein in the formula (3-1), (3-2), or (3-3), M is a hydrogen or alkali metal or ammonium group, X and Y are each a linking group, R1, R2, R3, R4, R5, and R6 are each independently hydrogen or an alkyl group having from 1 to 4 carbon atoms, and Rc is a hydrogen, an alkyl group, a sulfonic acid, —$SO_3M$, or an —$SO_3M$-containing group.

3. The support material for fused deposition modeling according to claim 2, wherein the structural unit represented by the above (3-1), (3-2), and (3-3) is contained at a rate of 0.01 to 10 mol % in the (A) polyvinyl alcohol-based resin having a group containing sulfonic acid or a salt thereof.

4. The support material for fused deposition modeling according to claim 1, wherein the content of (B) biodegradable polyester is from 5 to 100 parts by weight with respect to 100 parts by weight of (A) polyvinyl alcohol-based resin having a group containing sulfonic acid or a salt thereof.

5. The support material for fused deposition modeling according to claim 1, wherein the (A) polyvinyl alcohol-based resin having a group containing sulfonic acid or a salt thereof and the (B) biodegradable polyester have a phase-separated structure in which one is a matrix and the other is finely dispersed in the matrix.

6. The support material for fused deposition modeling according to claim 5, wherein the phase-separated structure is a sea-island structure in which the (B) biodegradable polyester is dispersed as an island component in the (A) polyvinyl alcohol-based resin having a group containing sulfonic acid or a salt thereof as a sea component.

7. The support material for fused deposition modeling according to claim 6, wherein a size of the domain consisting of the (B) biodegradable polyester is from 0.05 to 2 μm.

8. The support material for fused deposition modeling according to claim 1, wherein a ratio of an aliphatic dicarboxylic acid unit to a dicarboxylic acid unit in the (B) biodegradable polyester is in the range of from 40 to 80 mol %.

9. The support material for fused deposition modeling according to claim 1, wherein the support material for fused deposition modeling of a hot-melt type fused deposition modeling.

10. The support material for fused deposition modeling according to claim 9, wherein the support material for fused deposition modeling is in the form of filament.

11. A method of manufacturing a three-dimensional object comprising
extruding a molten support material for fused deposition modeling claimed in claim 1 and a molten model material,
solidifying the model material and the support material to form a structure layer by layer; and
bringing an obtained fused deposition modeled structure into contact with water.

12. The manufacturing method according to claim 11, wherein the model material is polylactic acid, acrylonitrile-butadiene-styrene resin, polyamide resin, polyethylene terephthalate, or polycarbonate.

13. A fused deposition modeled structure including a support structure made of a support material claimed in claim 1.

* * * * *